United States Patent
Chen et al.

(10) Patent No.: US 11,109,062 B2
(45) Date of Patent: Aug. 31, 2021

(54) METHOD AND APPARATUS OF MOTION REFINEMENT BASED ON BI-DIRECTIONAL OPTICAL FLOW FOR VIDEO CODING

(71) Applicant: MEDIATEK INC., Hsinchu (TW)

(72) Inventors: Ching-Yeh Chen, Hsinchu (TW); Tzu-Der Chuang, Hsinchu (TW); Yu-Wen Huang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 87 days.

(21) Appl. No.: 16/494,565

(22) PCT Filed: Mar. 2, 2018

(86) PCT No.: PCT/CN2018/077819
§ 371 (c)(1),
(2) Date: Sep. 16, 2019

(87) PCT Pub. No.: WO2018/166357
PCT Pub. Date: Sep. 20, 2018

(65) Prior Publication Data
US 2021/0127133 A1    Apr. 29, 2021

Related U.S. Application Data

(60) Provisional application No. 62/480,359, filed on Apr. 1, 2017, provisional application No. 62/474,702, filed
(Continued)

(51) Int. Cl.
*H04N 19/577* (2014.01)
*H04N 19/523* (2014.01)

(52) U.S. Cl.
CPC ......... *H04N 19/577* (2014.11); *H04N 19/523* (2014.11)

(58) Field of Classification Search
CPC .................. H04N 19/577; H04N 19/523
See application file for complete search history.

(56) References Cited

U.S. PATENT DOCUMENTS

2013/0083851 A1    4/2013  Alshin et al.

FOREIGN PATENT DOCUMENTS

| CN | 102934444 A | 2/2013 |
| CN | 103618904 A | 3/2014 |

(Continued)

OTHER PUBLICATIONS

Alshin, E. Alshina and T. Lee, "Bi-directional optical flow for improving motion compensation," 28th Picture Coding Symposium, Nagoya, 2010, pp. 422-425.*

(Continued)

*Primary Examiner* — Mohammed S Rahaman
(74) *Attorney, Agent, or Firm* — McClure, Qualey & Rodack, LLP

(57) ABSTRACT

Method and apparatus of using Bi-directional optical flow (BIO) for a true bi-direction predicted block are disclosed. According to one method of the present invention, a division-free BIO process is disclosed, where the x-motion offset and y-motion offset are derived using operations including right-shifting without any division operation. According to another method, a refined predictor is generated for the current block by applying BIO process to the reference blocks, where said applying the BIO process comprises applying a boundary-condition-dependent BIO process conditionally to boundary pixels associated with the reference blocks.

9 Claims, 5 Drawing Sheets

Related U.S. Application Data on Mar. 22, 2017, provisional application No. 62/472,002, filed on Mar. 16, 2017.

(56) References Cited

FOREIGN PATENT DOCUMENTS

| WO | 2017/036399 A1 | 3/2017 | |
|---|---|---|---|
| WO | WO2017036399 * | 3/2017 | ............. H04N 19/51 |
| WO | WO 2017036399 A1 * | 3/2017 | ........... H04N 19/577 |

OTHER PUBLICATIONS

International Search Report dated May 24, 2018, issued in application No. PCT/CN2018/077819.
Alshina, E., et al.; "Bi-directional optical flow;" Joint Collaborative Team on Video Coding (JCT-VC) of ITU-T SG16 WP3 and ISO/IEC JTC1/SC29/WG11; Oct. 2010; pp. 1-5.
Alshin, A. et. al.; "AHG6: On BIO memory bandwidth;" Joint Video Exploration Team (JVET) of ITU-T SG 16 WP 3 and ISO/IEC JTC 1/SC 29/WG 11; Oct. 2016; pp. 1-5.
European Search Report dated Nov. 5, 2020, issued in application No. EP 18766709.2.
Chen, J., et al.; "Algorithm description of Joint Exploration Test Model 5 (JEM5);" International Organization for Standardization; Jan. 2017; pp. 1-44.
Chinese language office action dated Mar. 29, 2021, issued in application No. CN 201880017432.X, Based on English citation No. and type.
Yang, F., et al.; "CTB splitting on frame boundary for arbitrary resolution video;" Joint Collaborative Team on Video Coding (JCT-VC) of ITU-T SG16 WP3 and ISO/IEC JTC1/SC29/WG11; Oct. 2010; pp. 1-4.
Murakami, T et al.; "TE1: Cross-check result of DMVD proposal JCTVC-C124 (Mitsubishi);" Joint Collaborative Team on Video Coding (JCT-VC) of ITU-T SG16 WP3 and ISO/IEC JTC1/SC29/WG11; Oct. 2010; pp. 1-27.

* cited by examiner

METHOD AND APPARATUS OF MOTION REFINEMENT BASED ON BI-DIRECTIONAL OPTICAL FLOW FOR VIDEO CODING

CROSS REFERENCE TO RELATED APPLICATIONS

The present invention claims priority to U.S. Provisional Patent Application, Ser. No. 62/472,002, filed on Mar. 16, 2017, U.S. Provisional Patent Application, Ser. No. 62/474,702, filed on Mar. 22, 2017 and U.S. Provisional Patent Application, Ser. No. 62/480,359, filed on Apr. 1, 2017. The U.S. Provisional Patent Applications are hereby incorporated by reference in their entireties.

FIELD OF INVENTION

The present invention relates to motion compensation using Bi-directional Optical flow (BIO) to refine motion for a bi-direction predicted block. In particular, the present invention relates to bandwidth reduction and computational complexity reduction associated with the BIO process.

BACKGROUND OF THE INVENTION

Bi-directional Optical Flow (BIO) Bi-directional optical flow (BIO) is motion estimation/compensation technique disclosed in JCTVC-C204 (E. Alshina, et al., *Bi-directional optical flow*, Joint Collaborative Team on Video Coding (JCT-VC) of ITU-T SG 16 WP 3 and ISO/IEC JTC 1/SC 29/WG 11, 3rd Meeting: Guangzhou, CN, 7-15 Oct. 2010, Document: JCTVC-C204) and VCEG-AZ05 (E. Alshina, et al., *Known tools performance investigation for next generation video coding*, ITU-T SG 16 Question 6, Video Coding Experts Group (VCEG), 52$^{nd}$ Meeting: 19-26 Jun. 2015, Warsaw, Poland, Document: VCEG-AZ05). BIO derived the sample-level motion refinement based on the assumptions of optical flow and steady motion as shown in FIG. 1, where a current pixel 122 in a B-slice (bi-prediction slice) 120 is predicted by one pixel in reference picture 0 (130) and one pixel in reference picture 1 (110). As shown in FIG. 1, the current pixel 122 is predicted by pixel B (112) in reference picture 1 (110) and pixel A (132) in reference picture 0 (130). In FIG. 1, $v_x$ and $v_y$ are pixel displacement vector in the x-direction and y-direction, which are derived using a bi-direction optical flow (BIO) model. It is applied only for truly bi-directional predicted blocks, which is predicted from two reference pictures corresponding to the previous picture and the latter picture. In VCEG-AZ05, BIO utilizes a 5×5 window to derive the motion refinement of each sample. Therefore, for an N×N block, the motion compensated results and corresponding gradient information of an (N+4)×(N+4) block are required to derive the sample-based motion refinement for the N×N block. According to VCEG-AZ05, a 6-Tap gradient filter and a 6-Tap interpolation filter are used to generate the gradient information for BIO. Therefore, the computational complexity of BIO is much higher than that of traditional bi-directional prediction. In order to further improve the performance of BIO, the following methods are proposed.

In a conventional bi-prediction in HEVC, the predictor is generated using equation (1), where $P^{(0)}$ and $P^{(1)}$ are the list0 and list1 predictor, respectively.

$$P_{Conventional}[i,j] = (P^{(0)}[i,j] + P^{(1)}[i,j] + 1) \gg 1 \quad (1)$$

In JCTVC-C204 and VECG-AZ05, the BIO predictor is generated using equation (2).

$$P_{OpticalFlow} = (P^{(0)}[i,j] + P^{(1)}[i,j] + v_x[i,j](I_x^{(0)} - I_x^{(1)}[i,j]) + v_y[i,j](I_y^{(0)} - I_y^{(1)}[i,j]) + 1) \gg 1 \quad (2)$$

In equation (2), $I_x^{(0)}$ and $I_x^{(1)}$ present the x-directional gradient in list0 and list1 predictor, respectively; $I_y^{(0)}$ and $I_y^{(1)}$ represent the y-directional gradient in list0 and list1 predictor, respectively; $v_x$ and $v_y$ represent the offsets or displacements in x- and y-direction, respectively. The derivation process of $v_x$ and $v_y$ is shown in the following. First, the cost function is defined as diffCost(x, y) to find the best values $v_x$ and $v_y$. In order to find the best values $v_x$ and $v_y$ to minimize the cost function, diffCost(x, y), one 5×5 window is used. The solutions of $v_x$ and $v_y$ can be represented by using $S_1$, $S_2$, $S_3$, $S_5$, and $S_6$.

$$\begin{aligned}
diffCost(x, y) &= \sum_{\Omega} \left( P^0(x,y) + v_x \frac{\partial P^0(x,y)}{\partial x} + v_y \frac{\partial P^0(x,y)}{\partial y} - \left( P^1(x,y) - v_x \frac{\partial P^1(x,y)}{\partial x} - v_y \frac{\partial P^1(x,y)}{\partial y} \right) \right)^2 \\
&= \sum_{\Omega} \left( P^0(x,y) - P^1(x,y) + v_x \left( \frac{\partial P^0(x,y)}{\partial x} + \frac{\partial P^1(x,y)}{\partial x} \right) + v_y \left( \frac{\partial P^0(x,y)}{\partial y} + \frac{\partial P^1(x,y)}{\partial y} \right) \right)^2.
\end{aligned} \quad (3)$$

The minimum cost function, mindiffCost(x, y) can be derived according to:

$$\frac{\partial diffCost(x,y)}{\partial v_x} = 0, \quad \frac{\partial diffCost(x,y)}{\partial v_y} = 0. \quad (4)$$

By solving equations (3) and (4), $v_x$ and $v_y$ can be solved according to eqn. (5):

$$v_x = \frac{S_3 S_5 - S_2 S_6}{S_1 S_5 - S_2 S_2}, \quad v_y = \frac{S_1 S_6 - S_3 S_2}{S_1 S_5 - S_2 S_2} \quad (5)$$

where, $$S_1 = \sum_{\Omega} \left( \frac{\partial P^0(x,y)}{\partial x} + \frac{\partial P^1(x,y)}{\partial x} \right)^2,$$

$$S_2 = \sum_{\Omega} \left( \frac{\partial P^0(x,y)}{\partial x} + \frac{\partial P^1(x,y)}{\partial x} \right) \left( \frac{\partial P^0(x,y)}{\partial y} + \frac{\partial P^1(x,y)}{\partial y} \right)$$

$$S_3 = -\sum_{\Omega} \left( \frac{\partial P^0(x,y)}{\partial x} + \frac{\partial P^1(x,y)}{\partial x} \right) (P^0(x,y) - P_1(x,y)),$$

$$S_5 = \sum_\Omega \left(\frac{\partial P^0(x,y)}{\partial y} + \frac{\partial P^1(x,y)}{\partial y}\right)^2$$

$$S_6 = -\sum_\Omega \left(\frac{\partial P^0(x,y)}{\partial y} + \frac{\partial P^1(x,y)}{\partial y}\right)(P^0(x,y) - P^1(x,y)).$$

In the above equations, $$\frac{\partial P^0(x,y)}{\partial x}$$

corresponds to the x-direction gradient of a pixel at (x,y) in the list 0 picture, $$\frac{\partial P^1(x,y)}{\partial x}$$

corresponds to the x-direction gradient of a pixel at (x,y) in the list 1 picture, $$\frac{\partial P^0(x,y)}{\partial y}$$

corresponds to the y-direction gradient of a pixel at (x,y) in the list 0 picture, and $$\frac{\partial P^1(x,y)}{\partial y}$$

corresponds to the y-direction gradient of a pixel at (x,y) in the list 1 picture.

In some related art, the $S_2$ can be ignored, and $v_x$ and $v_y$ can be solved according to $$v_x = \frac{S_2}{S_1}, \quad v_y = \frac{S_6 - v_x S_2}{S_5} \qquad (6)$$

where, $$S_1 = \sum_\Omega \left(\frac{\partial P^0(x,y)}{\partial x} + \frac{\partial P^1(x,y)}{\partial x}\right)^2,$$

$$S_2 = \sum_\Omega \left(\frac{\partial P^0(x,y)}{\partial x} + \frac{\partial P^1(x,y)}{\partial x}\right)\left(\frac{\partial P^0(x,y)}{\partial y} + \frac{\partial P^1(x,y)}{\partial y}\right)$$

$$S_3 = -\sum_\Omega \left(\frac{\partial P^0(x,y)}{\partial x} + \frac{\partial P^1(x,y)}{\partial x}\right)(P^0(x,y) - P_1(x,y)),$$

$$S_5 = \sum_\Omega \left(\frac{\partial P^0(x,y)}{\partial y} + \frac{\partial P^1(x,y)}{\partial y}\right)^2$$

$$S_6 = -\sum_\Omega \left(\frac{\partial P^0(x,y)}{\partial y} + \frac{\partial P^1(x,y)}{\partial y}\right)(P^0(x,y) - P^1(x,y))$$

According to the above equations, the division operations are required in the derivation of $v_x$ and $v_y$. The required bit-depth is large since there are lots of accumulations and square of pixel values in $S_1$, $S_2$, $S_3$, $S_5$, and $S_6$. If the bit-depth of pixel value in video sequences is 10 bits, one divider supporting 32 bits/28 bits for $v_x$ and another divider supporting 36 bits/29 bits for $v_y$ will be required. If the bit-depth is increased by fractional interpolation filter, then the dividers become 40 bits/36 bits for $v_x$ and 44 bits/37 bits for $v_y$. It is impractical to directly use a look-up-table (LUT) to replace the division when the required bit-depth becomes so large. Therefore, it is desirable to develop methods to simplify the division operations in the BIO process.

In the above equations, parameters $S_1$, $S_2$, $S_3$, $S_5$, and $S_6$ are related to the x-direction gradient and the y-direction gradient. For example, $S_1$ is calculated from the sum of the x-direction gradient of the reference block in list 0 and the x-direction gradient of the reference block in list 1. The square of the sum is used as $S_1$. $S_5$ is calculated from the sum of the y-direction gradient of the reference block in list 0 and the y-direction gradient of the reference block in list 1. The square of the sum is used as $S_5$. For convenience, parameters $S_1$, $S_2$, $S_3$, $S_5$, and $S_6$ are referred as gradient parameters in this disclosure. In practice, gradient parameters $S_1$, $S_2$, $S_3$, $S_5$, and $S_6$ often use fixed-point representation with a pre-defined bit-depth. Derivation of $v_x$ and $v_y$ will require multiplication, addition and division operations. Among which, the division operation is more costly in implementation.

In VCEG-AZ05, the BIO is implemented on top of HEVC reference software and it is always applied for those blocks that are predicted in true bi-directions (i.e., the true bi-direction predicted blocks). In HEVC, one 8-tap interpolation filter for the luma component and one 4-tap interpolation filter for the chroma component are used to perform fractional motion compensation. Considering one 5×5 window for one to-be-processed pixel in one 8×8 coding unit (CU) in BIO, the required bandwidth in the worst case is increased from (8+7)×(8+7)×2/(8×8)=7.03 to (8+7+4)×(8+7+4)×2/(8×8)=11.28 reference pixels per current pixel. In JVET D0042 (A. Alshin, et al., "AHG6: On BIO memory bandwidth", Joint Video Exploration Team (WET) of ITU-T SG 16 WP 3 and ISO/IEC JTC 1/SC 29/WG 11, 4th Meeting: Chengdu, CN, 15-21 Oct. 2016, Document: WET-D0042), in order to reduce the required bandwidth, the required data including motion compensated pixels and gradients in x and y directions will be set to zeros, if those pixels are outside of current block. As shown in FIG. 2, the centre square is the original MC region (210) for the current block, and BIO process requires the predictors and corresponding gradient in a Region A (220) and Region B (230) to derive the displacement respectively in order to further refine the predictors by using the derived displacement and gradients. In JVET D0042, the data from Region A (220) and Region B (230) will be set to zero in order to save the required bandwidth. Since the gradient is generated from additional 6-tap filters, the gradient and motion compensated pixels can be generated by using the same region as that in the original HEVC. Therefore, by using the method in JVET D0042, there is no additional bandwidth requirement in BIO process.

In D0042, the coefficient skipping in Region A (220) and Region B (230) is applied for each sub-block if the sub-block motion compensation is applied. However, if two adjacent sub-blocks have the same MV, these two sub-blocks cannot be merged as a larger block for the BIO process because the final results of two separated sub-blocks and the results of one merged block are different due to the coefficient skipping. For example, the coefficient skipping can be applied on the internal boundary between these two sub-blocks in the separated sub-block process, while the coefficient skipping is not applied on the internal boundary in the merged block process.

However, using additional 6-tap filters to generate the gradients in both the x and y directions are complicated compared to the original motion compensation design. Two additional 6-tap filters will be needed: one is used to generate gradients and the other is used to perform interpolation when the motion vector is fractional. Moreover, block-based process is also proposed to reduce the required computational complexity in VCEG-AZ05. Therefore, a low-complexity BIO is presented in the following. In low-complexity BIO, block-based derivation process is used instead of pixel-based derivation process, where each block is divided into 4×4 blocks (referred as BIO blocks in this disclosure) for block-based BIO process. In the original BIO, a 5×5 window is used to derive motion for each pixel. In the block-based BIO, a 6×6 window is used for each 4×4 block to derive the motion for the block. The calculation of gradients is also simplified by applying a 3-Tap filter with coefficients equal to [−1, 0, 1] on motion compensated pixels according to the low-complexity BIO. In FIG. 2, the smaller block 250 corresponds to a 4×4 block for block-based BIO. The dashed-line block 260 corresponds to the 6×6 window for deriving the motion information associated with the 4×4 block. For each pixel within the window, the predictor and gradient have to be calculated. For the {−1, 0, 1} gradient filter, the gradient in the x-direction and the y-direction for the pixel 240 at the upper left corner of window 260 needs surrounding pixels shown as black dots in FIG. 2. Therefore, the required bandwidth is the same as that in the original BIO, but no additional 6-tap filters are required and computational complexity is reduced by using block-based derivation process. It is desirable to develop methods to reduce the required memory bandwidth and further improve the coding performance of low-complexity BIO.

In a typical video coding system utilizing motion-compensated Inter prediction, motion information is usually transmitted from an encoder sider to a decoder so that the decoder can perform the motion-compensated Inter prediction correctly. In such systems, the motion information will consume some coded bits. In order to improve coding efficiency, a decoder-side motion vector derivation method is disclosed in VCEG-AZ07 (Jianle Chen, et al., Further improvements to HMKTA-1.0, ITU—Telecommunications Standardization Sector, Study Group 16 Question 6, Video Coding Experts Group (VCEG), 52$^{nd}$ Meeting: 19-26 Jun. 2015, Warsaw, Poland). According to VCEG-AZ07, the decoder-side motion vector derivation method uses two Frame Rate Up-Conversion (FRUC) Modes. One of the FRUC modes is referred as bilateral matching for B-slice and the other of the FRUC modes is referred as template matching for P-slice or B-slice.

Overlapped Block Motion Compensation (OBMC)

Overlapped Block Motion Compensation (OBMC) is a motion compensation technique that estimates a pixel's intensity value based on motion-compensated signals derived from its nearby block motion vectors (MVs) according to the Linear Minimum Mean Squared Error (LMMSE) criterion. From estimation-theoretic perspective, these MVs are regarded as different plausible hypotheses for its true motion, and to maximize coding efficiency, their weights should minimize the mean squared prediction error subject to the unit-gain constraint.

When High Efficient Video Coding (HEVC) was developed, several coding techniques based on OBMC were proposed in order to provide coding gain. Some of them are described as follows.

In JCTVC-C251, OBMC was applied to geometry partition. In geometry partition, it is very likely that a transform block contains pixels belonging to different partitions. In geometry partition, since two different motion vectors are used for motion compensation, the pixels at the partition boundary may have large discontinuities that can produce visual artefacts similar to blockiness. This, in turn, will decrease the transform coding efficiency. Let the two regions created by a geometry partition denoted by region 1 and region 2. A pixel from region 1 (2) is defined to be a boundary pixel if any of its four connected neighbours (i.e., left, top, right, and bottom) belongs to region 2 (1). FIG. 3 shows an example of region partition, where a block 310 is partitioned into region 1 and region 2 across region boundary 320. Pixel 330 indicates a region 1 boundary pixel and pixel 340 indicates a region 2 boundary pixel. If a pixel is a boundary pixel, the motion compensation is performed using a weighted sum of the motion predictions from the two motion vectors. The weights are ¾ for the prediction using the motion vector of the region containing the boundary pixel and ¼ for the prediction using the motion vector of the other region. The overlapping boundaries improve the visual quality of the reconstructed video as well as provide coding efficiency in terms of BD-rate gain.

In JCTVC-F299, OBMC is applied to symmetrical motion partitions. If a coding unit (CU) is partitioned into two 2N×N or N×2N prediction units (PUs), OBMC is applied to the horizontal boundary of the two 2N×N prediction blocks, and to the vertical boundary of the two N×2N prediction blocks. Since those partitions may have different motion vectors, the pixels at partition boundaries may have large discontinuities, which may cause visual artefacts and also reduce the transform/coding efficiency. In JCTVC-F299, OBMC is introduced to smooth the boundaries of motion partition.

FIG. 4A illustrates an example of OBMC for 2N×N partition and FIG. 4B illustrates an example of OBMC for N×2N partition. The line-filled pixels represent pixels belonging to Partition 0 and blank pixels represent pixels belonging to Partition 1. The overlapped region in the luma component is defined as two rows or two columns of pixels on each side of the horizontal or vertical boundary respectively. For pixel row or column (i.e., pixels labelled as A in FIG. 4A and FIG. 4B) that is adjacent to the partition boundary, OBMC weighting factors are (¾, ¼). For pixels (i.e., pixels labelled as B in FIG. 4A and FIG. 4B) that are two rows or columns away from the partition boundary, OBMC weighting factors are (⅞, ⅛). For chroma components, the overlapped region is defined as one row or one column of pixels on each side of the horizontal or vertical boundary respectively, and the weighting factors are (¾, ¼).

Currently, the MC results for the overlapped region between two CUs or PUs are generated by another MC process after the normal MC process for current CU or PU. Therefore, BIO is applied twice in these two MC process to refine these two MC results, respectively. When two neighbouring MVs are the same, the above processing order can help to skip the redundant OBMC and BIO processes. However, the required bandwidth and MC operations for the overlapped region is increased compared to integrated OBMC process and normal MC process. For example, the current PU size is 16×8, the overlapped region is 16×2, and the interpolation filter in MC is 8-tap. If the OBMC is performed after normal MC, (16+7)×(8+7)+(16+7)×(2+7)= 552 reference pixels per reference list for current PU and the related OBMC will be required. If the OBMC operations are integrated with the normal MC, only (16+7)×(8+2+7)=391 reference pixels per reference list will be required for the current PU and the related OBMC. Therefore, it is desirable to reduce the computational complexity or memory bandwidth of BIO when BIO and OBMC are enabled simultaneously.

BRIEF SUMMARY OF THE INVENTION

Method and apparatus of using Bi-directional optical flow (BIO) for a true bi-direction predicted block are disclosed. According to one method of the present invention, input data associated with a current block in a current picture are received, where the current block is coded using bi-direction prediction. A first reference block associated with the current block in a first reference picture from reference picture list 0 and a second reference block associated with the current block in a second reference picture from reference picture list 1 are determined, where the first reference block and the second reference block are pointed by true bi-direction motion vectors. First x-gradients and first y-gradients are derived based on the first reference block, and second x-gradients and second y-gradients are derived based on the second reference block. A set of gradient parameters is derived based on the first x-gradients, the first y-gradients, the second x-gradients, the second y-gradients, first pixel values of the first reference block, second pixel values of the second reference block or a combination thereof, where all gradient parameters use fixed-point representations. The x-motion offset and y-motion offset are derived using operations including right-shifting without any division operation, where the x-motion offset corresponds to a first numerator divided by a first denominator, and the y-motion offset corresponds to a second numerator divided by a second denominator, and wherein the first numerator, the first denominator, the second numerator and the second denominator are generated from linear combinations of products of two gradient parameters or linear combinations of the gradient parameters. A refined predictor is generated for the current block according to the first reference block, the second reference block, the first x-gradients and the first y-gradients, the second x-gradients and the second y-gradients, the x-motion offset, the y-motion offset, or a combination thereof. The current block is encoded or decoded based on the refined predictor.

The method may further comprise determining a first MSB position, Nx, of the first denominator and a second MSB position, Ny, of the second denominator, wherein the x-motion offset is derived using operations including right-shifting the first numerator and the first denominator by Nx bits and right-shifting the second numerator and the second denominator by Ny bits. Values of $(2Px/2(K-1))$ can be stored in a first lookup table and values of $(2Py/2(K-1))$ can be stored in a second lookup table, where $2(K-1)$ corresponds to possible values of the first denominator and the second denominator, and the x-motion offset is derived using operations including multiplication and right-shifting by Px bits and the y-motion offset is derived using operations including multiplication and right-shifting by Py bits. In one embodiment, the first lookup table is the same as the second lookup table. In another embodiment, the first lookup table is different from the second lookup table. In one embodiment, K corresponds to 1. The right-shifting the first numerator and the first denominator by Nx bits or the right-shifting the second numerator and the second denominator by Ny bits may use a rounding offset.

A non-transitory computer readable medium storing program instructions causing a processing circuit of an apparatus to perform the above video coding method is also disclosed. As mentioned above, the method comprises receiving input data; determining the first reference block and the second reference block; deriving first x-gradients and first y-gradients based on the first reference block, and second x-gradients and second y-gradients based on the second reference block; deriving a set of gradient parameters; deriving x-motion offset and y-motion offset; generating a refined predictor; and encoding or decoding the current block based on the refined predictor.

According to another method, after the first reference block and the second reference block are determined, a refined predictor is generated for the current block by applying BIO process to the first reference block and the second reference block, wherein said applying the BIO process comprises applying an boundary-condition-dependent BIO process conditionally to boundary pixels associated with the first reference block and the second reference block depending on a block or sub-block boundary condition, where the boundary-condition-dependent BIO process comprises padding unavailable data required for a regular BIO process or skipping the unavailable data by modifying the regular BIO process. The unavailable data correspond to target data required for the regular BIO process, but not available from the first reference block and the second reference block. The current block is encoded or decoded based on the refined predictor.

The target data may correspond to target reference data from the first reference block and the second reference block, gradients of the target reference data, motion-compensated target reference data, or a combination thereof. In one embodiment, the boundary-condition-dependent BIO process is applied to the boundary pixels if the boundary pixels correspond to block boundaries of the current block, and the boundary-condition-dependent BIO process is not applied to the boundary pixels if the boundary pixels correspond to motion-compensated block boundaries of the current block. In another embodiment, the boundary-condition-dependent BIO process is applied to the boundary pixels if the boundary pixels correspond to a sub-block boundary between two adjacent sub-blocks having two different motion vectors, a horizontal sub-block boundary between two vertically adjacent sub-blocks or a vertical sub-block boundary between two horizontally adjacent sub-blocks. In still yet another embodiment, the boundary-condition-dependent BIO process is not applied to the boundary pixels if the boundary pixels correspond to a sub-block boundary between two adjacent sub-blocks having a same motion vector, a vertical sub-block boundary between two horizontally adjacent sub-blocks having a same motion vector, or a horizontal sub-block boundary between two vertically adjacent sub-blocks having a same motion vector.

A non-transitory computer readable medium storing program instructions causing a processing circuit of an apparatus to perform the above video coding method is also disclosed. As mentioned above, the method comprises receiving input data; determining the first reference block and the second reference block; generating a refined predictor for the current block by applying BIO process, wherein said applying the BIO process comprises applying a boundary-condition-dependent BIO process conditionally to boundary pixels; and encoding or decoding the current block based on the refined predictor.

BRIEF DESCRIPTION OF THE DRAWINGS

FIG. 4A illustrates an example of OBMC for 2N×N partition.

FIG. 4B illustrates an example of OBMC for N×2N partition.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

As mentioned previously, Bi-directional Optical Flow (BIO) and the BIO combined with Overlapped Block Motion Compensation (OBMC) require accessing additional reference data, which causes increased system bandwidth. These processes also increase computational complexity. In the present invention, techniques to reduce the system bandwidth and/or computational complexity associated with BIO, and BIO with OBMC are disclosed.

Division-Free BIO Process

As mentioned before, the BIO process requires deriving the offsets vx and vy as shown in equations (5) and (6). The required computations are rather extensive. In particular, division operations are required to derive offsets vx and vy based on the gradient parameters. As is known in the art, the computational complexity involved with the division operation is much higher than the addition and multiplication operations. Therefore, it is desirable to avoid the division operations.

Accordingly, a method is disclosed to use the dynamic right shift to reduce the required bit-depth in the division process or eliminate the division process. The proposed method is first to determine the MSB position of denominator and only to keep the first K MSB-bits of denominator using the right-shifting by N-bits operation. At the same time, the numerator is also right shifted by N bits. The possible values of denominator becomes 2(K−1), and the value of (2P/2(K−1)) can be pre-calculated and stored in a look-up-table (LUT). Accordingly, the division operation can be replaced by using multiplication and right-shifting by P bits, as shown in the following equations:

$$vx=((S3>>Nx)\times LUT[(S1>>Nx)])>>Px, \text{ and}$$

$$vy=((S6-vx \cdot S2)>>Ny)\times LUT[(S5>>Ny)])>>Py.$$

In the above equations, Nx and Ny represent the number of bits associated with right-shifting the denominators, S1 and S5 respectively. Px and Py represent the number of bits associated with right-shifting the LUT for vx and vy respectively. The LUTs for vx and vy can be the same or different. In one embodiment, a rounding offset can be added when performing the right-shifting operation. In another embodiment, only the first MSB bit of denominator is kept. In this case, K corresponds to 1 and only dynamic right-shifting is required to replace the division in the BIO process.

Offsets vx and vy Reuse in the OBMC Region

Figure 5A:
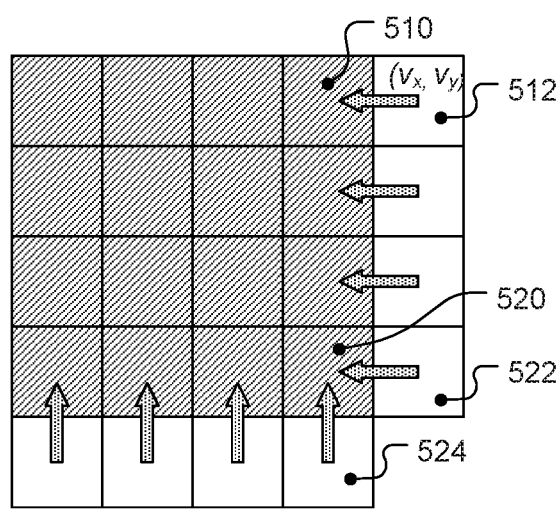
FIG. 5A illustrates an example of displacements inheritance, where the displacements of a current coding unit are copied from a neighbouring coding unit.
Figure 5B:
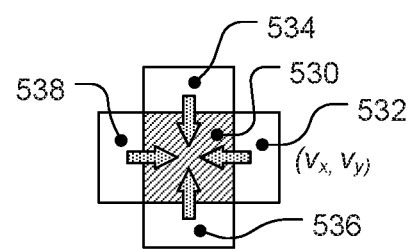
FIG. 5B illustrates an example of displacements inheritance, where the displacements of a current block are copied from neighbouring sub-blocks.

In the BIO process, the small displacements (also referred as offsets in this disclosure), vx and vy, are derived based on gradients of pixel value in the x and y directions and used to refine the MC predictor. This derivation can be block-based or pixel-based operations. In order to reduce the computational complexity of the related OBMC process with BIO, the small displacements in the normal MC process are reused for those blocks or pixels in the OBMC region according to this method. In other words, in the related OBMC process with BIO, the small displacements can be copied or inherited from those in the normal MC process. For example, the small displacements of boundary pixels or blocks in the normal MC region can be directly used for those pixels or blocks in the related OBMC region. FIG. 5A illustrates an example of displacements inheritance, where the displacements of a current coding unit can be used for a neighbouring coding unit. For example, the displacements of current coding unit 510 can be used for neighbouring block 512; the displacements of current coding unit 520 can be directly used for neighbouring coding unit 522 or 524. FIG. 5B illustrates an example of displacements inheritance, where the displacements of a current block 530 can be used for neighbouring sub-blocks. For example, the displacements of current block 530 can be used for neighbouring sub-block 532, 534, 536 or 538.

Processing Order for OBMC and BIO

Currently, the processing order of OBMC and BIO is to apply BIO first to refine MC predictors, and then to apply OBMC to blend two refined MC predictors. The processing order is changed to reduce the computational complexity according to this method. According to this method, OBMC blending is performed first to generate a new MC predictor and BIO process is applied afterword. Therefore, the BIO process can be reduced from two times to once.

Bandwidth Reduction for BIO

Figure 1:
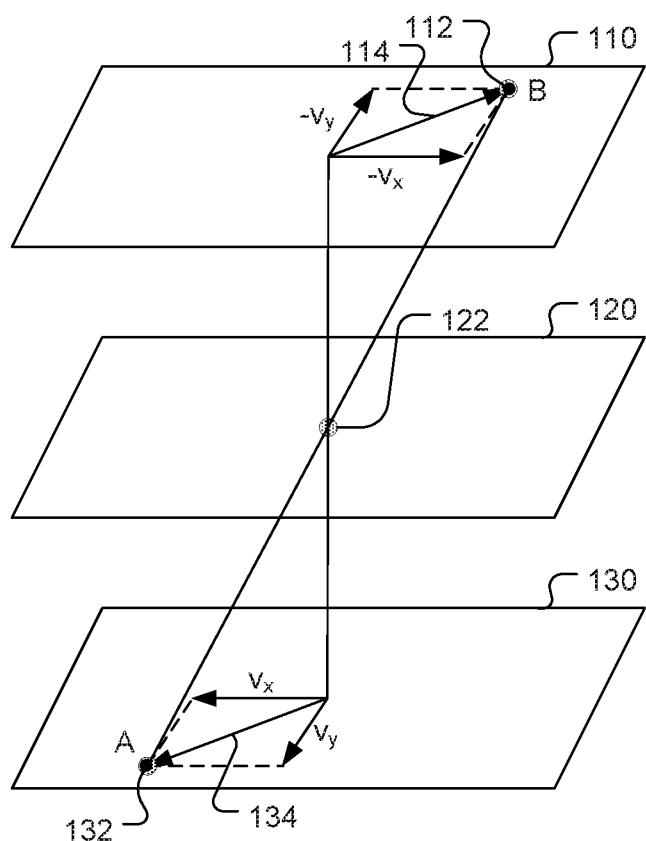
FIG. 1 illustrates an example of Bi-directional Optical Flow (BIO) to derive offset motion vector for motion refinement.
Figure 2:
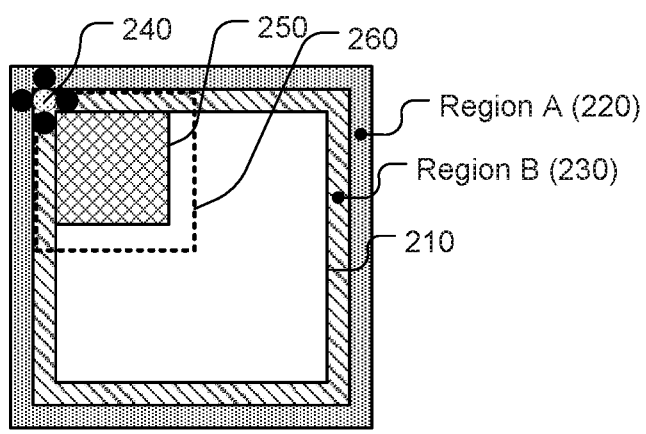
FIG. 2 illustrates the motion-compensated region and its neighbouring pixels required to derive the gradient and displacement related to Bi-directional Optical Flow (BIO).
Figure 3:
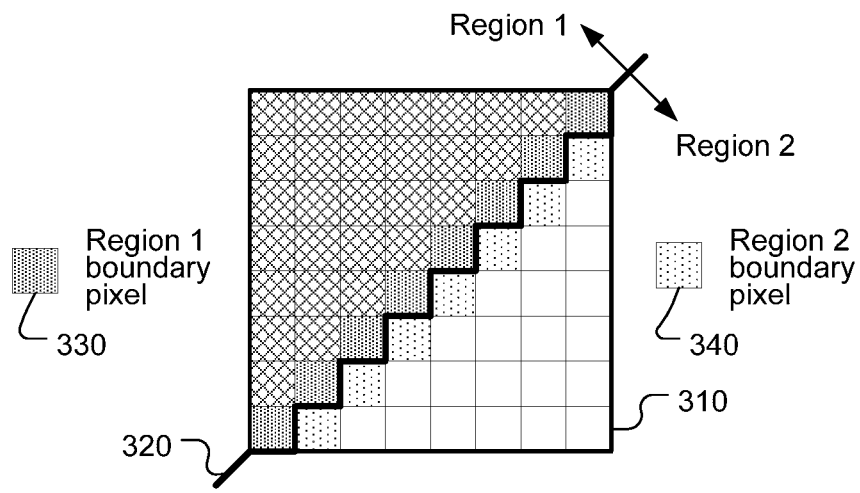
FIG. 3 shows an example of region partition, where a block is partitioned into region 1 and region 2 across region boundary.

In a low complexity BIO process, a 3-Tap filter with coefficients equal to [−1, 0, 1] on motion compensated pixels has been used. In low-complexity BIO, motion-compensated pixels from Region A (220) and Region B (230) in FIG. 2 are used to calculate the gradients, and these gradients are used to derive the displacement and refine the final predictor. As shown in FIG. 2, motion-compensated pixels from Region A (220) and Region B (230) are outside the boundary of the motion-compensated block 210. In order to reduce the bandwidth, the gradient calculation for pixels at the CU boundary is modified to avoid the need for data from Region A (220) and Region B (230). For example, a 2-Tap filter with filter coefficients equal to [−1, 1] is used to generate gradients for those pixels at the CU boundaries. Since the gradient calculation is different, some normalization may be required based on filter tap distance. In another embodiment, the BIO refinement is skipped for those pixels at the CU boundaries.

Block Size Selection for BIO Process

In the low-complexity BIO, block-based derivation process is used instead of pixel-based derivation process, which can save the computational complexity significantly. However, using one pre-defined block size may not achieve the best coding gain for videos with different resolutions and different contents. According to the present method, the block size may be dependent on video resolution or the characteristics of video contents. For example, for some smooth regions, the block size should be larger enough to include more textures for deriving an accurate displacement. However, for some complicated textures or motion regions, the block size should be small to adapt to the localization. Therefore, in one embodiment, the block size is dependent on video resolution. In another embodiment, the block size is dependent on the CU size. For example, when the CU size is small, then a small block size is used. In another embodiment, the block size is dependent on the usage of sub-block motion partition. If current CU is coded using sub-block motion partition, a smaller block size is used for the BIO. In another embodiment, the block size is dependent on the motion compensated pixels. For example, if the variance of motion compensated pixels is large or there are some strong edges in the motion-compensated (MC) regions, a smaller block size is used for the BIO. The above methods can be combined to implicitly determine the block size in the BIO process or explicitly signal the selected block size in the bitstream at the sequence level, picture level, slice level, CTU level, or CU level.

Boundary Condition Dependent BIO Process

In order to solve the issue of different results of processing the sub-blocks jointly or separately, a boundary-condition-dependent BIO process is disclosed. The present BIO boundary process is dependent on the block/sub-block boundary condition. The present BIO boundary process refers to the BIO process applied to the boundary region. As mentioned before, the BIO process requires pixels from outside the current block as shown in FIG. 2. For motion compensation, reference data outside the current block will be required to support fractional motion vectors. As shown in FIG. 2, the motion-compensated region 210 is required to support fractional motion vectors. The BIO process may require additional reference data outside the motion-compensated region in order to perform filtering and to derive gradients. Depending on whether the BIO sub-blocks processing is performed jointly or separately, required data regions may be different. In order to resolve the different data requirement, a present invention discloses boundary-condition-dependent BIO process. When required data (referred as required region) for the BIO process is not available, the boundary-condition-dependent BIO process may pad or skip the unavailable data. The data may correspond to reference pixels, gradients or motion-compensated results, or a combination thereof. When the required data are not available, the unavailable data can be padded. Data padding is known in the art of video and image processing. For example, the unavailable data can be padded by repeating boundary pixels, repeating boundary pixels with mirroring, or using pre-defined pixel values. The unavailable data may also be resolved by skipping the unavailable data. For example, the BIO process at boundary can be modified instead of changing the data source by padding when the required data in BIO process are not in an "available region". Accordingly, the required data are "skipped" to avoid the need for the unavailable data. For example, if reference pixels outside the available region in the interpolation process of BIO are required, an embodiment of the current method may change the interpolation process (e.g. shrinking the filter tap, skipping one interpolation filter coefficient, etc.) to avoid using these reference pixels. In another example, if motion-compensated pixels outside the available region in the gradient calculation of BIO are needed, an embodiment of the current method may change the gradient process (e.g. modifying the calculation of the gradients, setting the gradients equal to 0, etc.) to avoid the need of generating these motion-compensated pixels. In yet another example, if the gradients outside the available region are needed in the derivation process of BIO, an embodiment of the current method may change the derivation process (e.g. shrinking the window size, skipping the gradients, etc.) to avoid the need for generating these gradients.

In one embodiment, if the boundary is a CU/PU boundary, padding the reference pixel, gradient or compensation result, or skipping the coefficient, reference pixel, gradient or compensation result is applied. If the boundary is sub-block boundary and the adjacent MVs are the same, padding the reference pixel, gradient or compensation result, or skipping the coefficient, reference pixel, gradient or compensation result is not applied. If the boundary is sub-block boundary and the adjacent MVs are different, padding the reference pixel, gradientor compensation result, or skipping the coefficient, reference pixel, gradient or compensation result is applied. Accordingly, the results of processing the sub-blocks jointly or separately will be the same.

In another embodiment, if the boundary is CU/PU boundary, padding the reference pixel, gradient or compensation result, or skipping the coefficient, reference pixel, gradient or compensation result is applied to save the memory bandwidth. If the boundary is vertical sub-block boundary (i.e., the boundary between two horizontal adjacent sub-blocks) and the adjacent MVs are the same, padding the reference pixel, gradient or compensation result, or skipping the coefficient, reference pixel, gradient or compensation result is not applied. If the boundary is sub-block boundary and the adjacent MVs are different or horizontal sub-block boundary, padding the reference pixel, gradient or compensation result, or skipping the coefficient, reference pixel, gradient or compensation result is applied. Accordingly, the results of processing the sub-blocks jointly or separately in horizontal direction will be the same.

In another embodiment, if the boundary is CU/PU boundary, padding the reference pixel, gradient or compensation result, or skipping the coefficient, reference pixel, gradient or compensation result is applied to save the memory bandwidth. If the boundary is horizontal sub-block boundary (the boundary between two vertical adjacent sub-blocks) and the adjacent MVs are the same, padding the reference pixel, gradient or compensation result, or skipping the coefficient, reference pixel, gradient or compensation result is not applied. If the boundary is sub-block boundary and the adjacent MVs are different or vertical sub-block boundary, padding the reference pixel, gradient or compensation result, or skipping the coefficient, reference pixel, gradient or compensation result is applied. Accordingly, the results of processing the sub-blocks jointly or separately in vertical direction will be the same.

In yet another embodiment, for every block boundary regardless of PU/CU boundary or sub-block boundary, padding the reference pixel, gradient or compensation result, or skipping the coefficient, reference pixel, gradient or compensation result is not applied if the adjacent MVs of two sides are the same. Otherwise, padding the reference pixel, gradient or compensation result, or skipping the coefficient, reference pixel, gradient or compensation result is applied.

In yet another embodiment, for every block boundary except for the CTU (coding tree unit) or CTU row boundary, if the adjacent MVs of two sides are the same, padding the reference pixel, gradient or compensation result, or skipping the coefficient, reference pixel, gradient or compensation result is not applied. Otherwise, padding the reference pixel, gradient or compensation result, or skipping the coefficient, reference pixel, gradient or compensation result is applied.

OBMC and BIO

The overlapped block motion compensation is usually used to reduce the block artefact in video coding. In JEM, for a PU/CU, the upper rows and the left columns are weighted-compensated using the MVs of the upper blocks and the MVs of the left blocks. In other words, the motion compensation of the current block will be further extended to the right and to the bottom to compensate the right neighbouring block and the bottom neighbouring block.

Since OBMC can be combined in the normal MC process, the BIO operations are integrated with those in the normal MC process according to the present method. Therefore, some data required by the BIO process can reuse the data used in the normal MC process, which includes the MC predictor, pixel gradients, and intermediate results of MC interpolation to avoid redundant computation and reduce required memory bandwidth. For example, the PU size can be M×N and the related OBMC size can be M×4. If the MC with BIO for the current PU and the related OBMC are performed separately, (M+4+7)×(N+4+7) and (M+4+7)×(4+4+7) reference pixels per reference list will be required respectively. If the OBMC process integrated with the normal MC process is used, then only (M+4+7)×(N+4+4+7) reference pixels per reference list will be required. If the PU size is 16×8, then the memory bandwidth can be reduced from 918 reference pixels per reference list to 621 reference pixels per reference list. If the OBMC process is applied to more than one boundary, the memory bandwidth reduction becomes larger. Some intermediate data generated in the normal MC process with BIO can be reused in the related OBMC process. For example, the intermediate results can be the partial results in the interpolation process or the gradient values used in BIO. Therefore, reusing these intermediate data only reduces the memory bandwidth, but also reduces the required computational complexity of the related OBMC process.

In another embodiment, the BIO is applied when OBMC can be combined in the normal MC process. The OBMC region may include the right region and the bottom region, or even the top region and the left region if the sub-block MC is applied. Since the OBMC will load additional reference pixels for the right region and the bottom region, the BIO of current block doesn't need to perform the result padding for the reference pixel, gradient or compensation, or the result skipping for the coefficient, reference pixel, gradient or compensation because the data are already loaded by the OBMC. According to one embodiment, the result padding for the reference pixel, gradient or compensation, or the result skipping for the coefficient, reference pixel, gradient or compensation, or any boundary dependent process to reduce the bandwidth on the OBMC region boundary is applied. Those techniques will not be applied to the boundary between the current block and the OBMC regions.

In another embodiment, the BIO is further disabled on the OBMC region. That is, the BIO is applied to the current block only and the boundary dependent processes to reduce the memory bandwidth are not applied, if the required data will be loaded by OBMC region.

The "boundary condition dependent BIO process" and "integrated OBMC and BIO" can be combined. For example, for performing the BIO, the boundary between current block and OBMC block doesn't need to apply the result padding for the reference pixel, gradient or compensation, or the result skipping for the coefficient, reference pixel, gradient or compensation, or any boundary dependent process in order to reduce the bandwidth.

Figure 6:
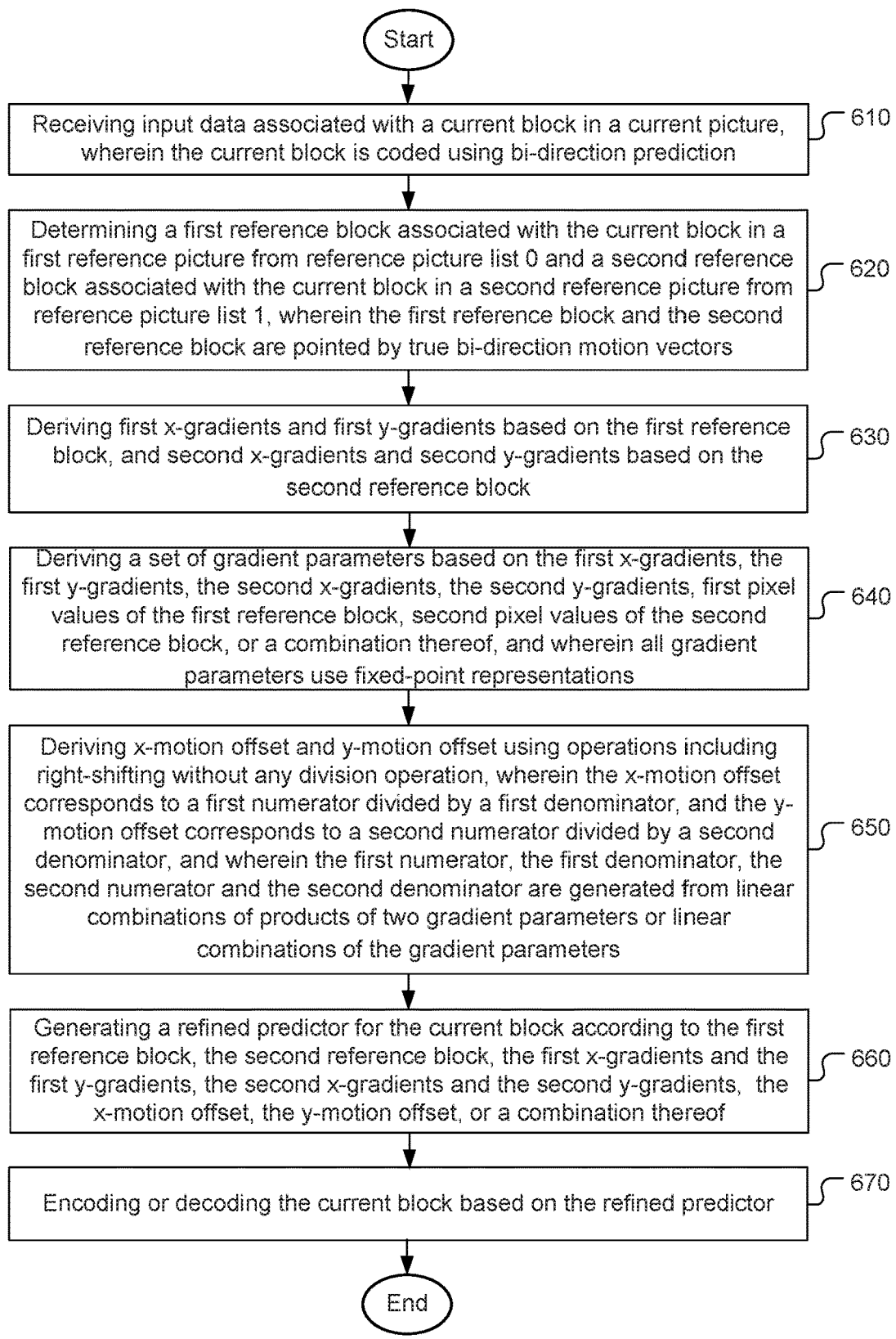
FIG. 6 illustrates an exemplary flowchart of a video coding system using bi-directional optical flow (BIO) to refine motion for a bi-direction predicted block according to an embodiment of the present invention, where the offsets are derived using right-shifting without the need for division operations.

FIG. 6 illustrates an exemplary flowchart of a video coding system using bi-directional optical flow (BIO) to refine motion for a bi-direction predicted block according to an embodiment of the present invention, where the offsets are derived using right-shifting without the need for division operations. The steps shown in the flowchart, as well as other flowcharts in this disclosure, may be implemented as program codes executable on one or more processors (e.g., one or more CPUs) at the encoder side and/or the decoder side. The steps shown in the flowchart may also be implemented based on hardware such as one or more electronic devices or processors arranged to perform the steps in the flowchart. According to this method, input data associated with a current block in a current picture is received in step 610, where the current block is coded using bi-direction prediction. A first reference block associated with the current block in a first reference picture from reference picture list 0 and a second reference block associated with the current block in a second reference picture from reference picture list 1 are derived in step 620, where the first reference block and the second reference block are pointed by true bi-direction motion vectors. First x-gradients and first y-gradients are derived based on the first reference block, and second x-gradients and second y-gradients are derived based on the second reference block in step 630. The definition of x-gradients (i.e., gradients in the x-direction) and y-gradients (i.e., gradients in the y-direction) has been disclosed previously in the disclosure. A set of gradient parameters are derived based on the first x-gradients, the first y-gradients, the second x-gradients, the second y-gradients, first pixel values of the first reference block, second pixel values of the second reference block, or a combination thereof in step 640, and where all gradient parameters use fixed-point representations. As mentioned before, the set of gradient parameters may corresponds to gradient parameters S1, S2, S3, S5, and S6 as shown in equations (5) and (6). X-motion offset and y-motion offset are derived using operations including right-shifting without any division operation in step 650, where the x-motion offset corresponds to a first numerator divided by a first denominator, and the y-motion offset corresponds to a second numerator divided by a second denominator, and where the first numerator, the first denominator, the second numerator and the second denominator are generated from linear combinations of products of two gradient parameters or linear combinations of the gradient parameters. As shown in equations (5) and (6), the offsets can be derived from gradient parameters S1, S2, S3, S5, and S6. However, the present invention utilizes right-shifting operations to derive the offsets from gradient parameters to avoid the need for the division operations. A refined predictor for the current block is generated according to the first reference block, the second reference block, the first x-gradients and the first y-gradients, the second x-gradients and the second y-gradients, the x-motion offset, the y-motion offset, or a combination thereof in step 660. Equation (2) illustrates an example of refined predictor derivation using the offsets. The current block is encoded or decoded based on the refined predictor in step 670.

Figure 7:
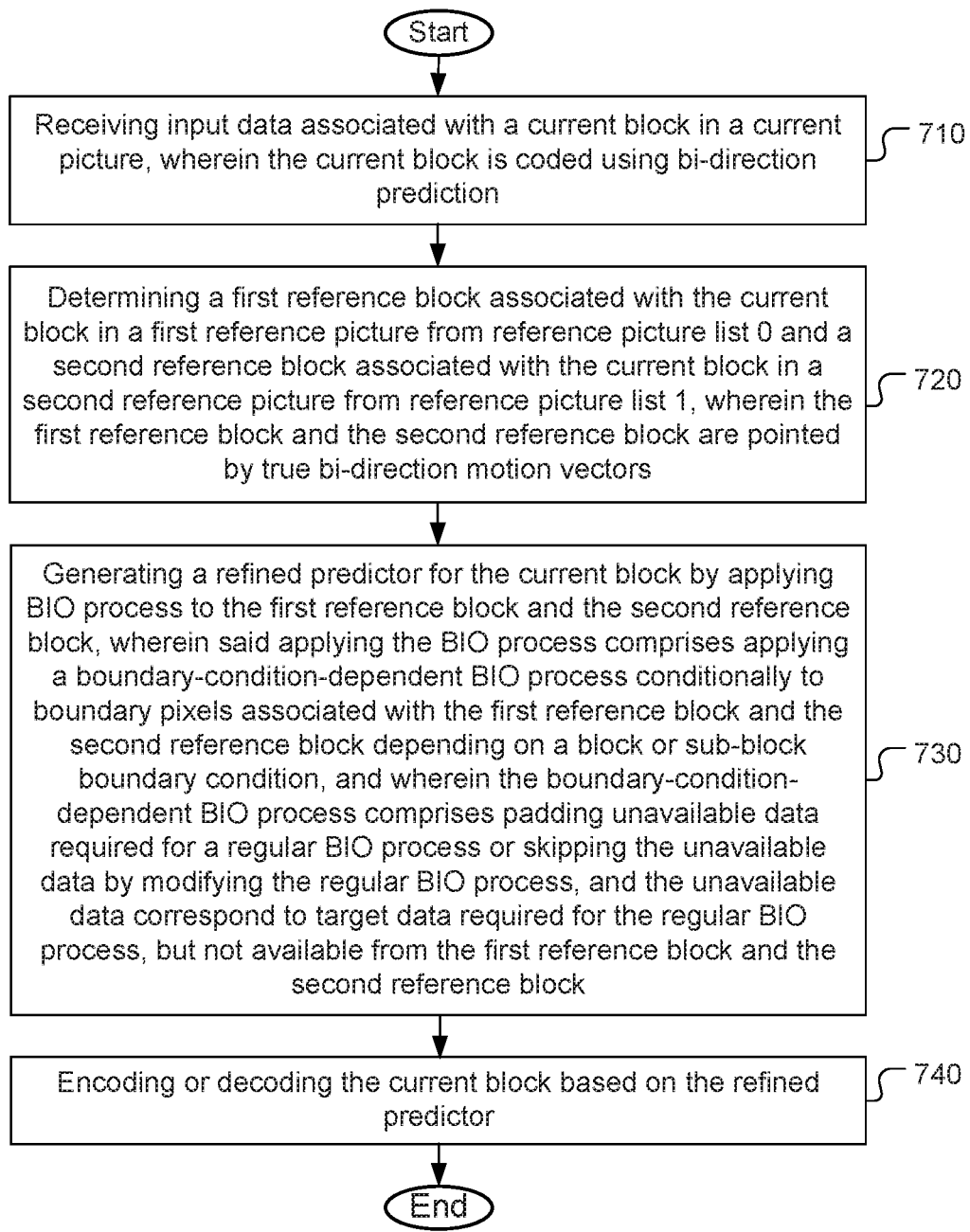
FIG. 7 illustrates an exemplary flowchart of a video coding system using bi-directional optical flow (BIO) to refine predictor for a bi-direction predicted block according to an embodiment of the present invention, where the an boundary-condition-dependent BIO process is applied conditionally to boundary pixels associated with the reference blocks k depending on a block or sub-block boundary condition.

FIG. 7 illustrates an exemplary flowchart of a video coding system using bi-directional optical flow (BIO) to refine predictor for a bi-direction predicted block according to an embodiment of the present invention, where the an boundary-condition-dependent BIO process is applied conditionally to boundary pixels associated with the reference blocks k depending on a block or sub-block boundary condition. According to this method, input data associated with a current block in a current picture is received in step 710, where the current block is coded using bi-direction prediction. A first reference block associated with the current block in a first reference picture from reference picture list 0 and a second reference block associated with the current block in a second reference picture from reference picture list 1 are derived in step 720, where the first reference block and the second reference block are pointed by true bi-direction motion vectors. A refined predictor is generated for the current block by applying BIO process to the first reference block and the second reference block in step 730, where said applying the BIO process comprises applying a boundary-condition-dependent BIO process conditionally to boundary pixels associated with the first reference block and the second reference block depending on a block or sub-block boundary condition, and where the boundary-condition-dependent BIO process comprises padding unavailable data required for a regular BIO process or skipping the unavailable data by modifying the regular BIO process, and the unavailable data correspond to target data required for the regular BIO process, but not available from the first reference block and the second reference block. The current block is encoded or decoded based on the refined predictor in step 740.

The flowcharts shown above are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding using Bi-directional optical flow (BIO) for a true bi-direction predicted block, the method comprising:

receiving input data associated with a current block in a current picture, wherein the current block is coded using bi-direction prediction;

determining a first reference block associated with the current block in a first reference picture from reference picture list 0 and a second reference block associated with the current block in a second reference picture from reference picture list 1, wherein the first reference block and the second reference block are pointed by true bi-direction motion vectors;

deriving first x-gradients and first y-gradients based on the first reference block, and second x-gradients and second y-gradients based on the second reference block;

deriving a set of gradient parameters based on the first x-gradients, the first y-gradients, the second x-gradients, the second y-gradients, first pixel values of the first reference block, second pixel values of the second reference block, or a combination thereof, and wherein all gradient parameters use fixed-point representations;

deriving x-motion offset and y-motion offset using operations including right-shifting without any division operation, wherein the x-motion offset corresponds to a first numerator divided by a first denominator, and the y-motion offset corresponds to a second numerator divided by a second denominator, and wherein the first numerator, the first denominator, the second numerator and the second denominator are generated from linear combinations of products of two gradient parameters or linear combinations of the gradient parameters from the set of gradient parameters;

generating a refined predictor for the current block according to the first reference block, the second reference block, the first x-gradients and the first y-gradients, the second x-gradients and the second y-gradients, the x-motion offset, the y-motion offset, or a combination thereof; and encoding or decoding the current block based on the refined predictor.

2. The method of claim 1, further comprising determining a first most significant bit (MSB) position, $N_x$, of the first denominator and a second MSB position, $N_y$, of the second denominator, wherein the x-motion offset is derived using operations including right-shifting the first numerator and the first denominator by $N_x$ bits and right-shifting the second numerator and the second denominator by $N_y$ bits, where N is a positive integer.

3. The method of claim 2, wherein values of $(2^{Px}/2^{(K-1)})$ are stored in a first lookup table and values of $(2^{Py}/2^{(K-1)})$ are stored in a second lookup table, and wherein $2^{(K-1)}$ corresponds to possible values of the first denominator and the second denominator, and the x-motion offset is derived using operations including multiplication and right-shifting by Px bits and the y-motion offset is derived using operations including multiplication and right-shifting by Py bits, where P and K are positive integers.

4. The method of claim 3, wherein the first lookup table is the same as the second lookup table.

5. The method of claim 3, wherein the first lookup table is different from the second lookup table.

6. The method of claim 3, wherein K corresponds to 1.

7. The method of claim 2, wherein said right-shifting the first numerator and the first denominator by $N_x$ bits or said right-shifting the second numerator and the second denominator by $N_y$ bits uses a rounding offset.

8. An apparatus of video coding using Bi-directional optical flow (BIO) for a true bi-direction predicted block, the apparatus of video coding comprising one or more electronic circuits or processors arranged to:

receive input data associated with a current block in a current picture, wherein the current block is coded using bi-direction prediction;

determine a first reference block associated with the current block in a first reference picture from reference picture list 0 and a second reference block associated with the current block in a second reference picture from reference picture list 1, wherein the first reference block and the second reference block are pointed by true bi-direction motion vectors;

derive first x-gradients and first y-gradients based on the first reference block, and second x-gradients and second y-gradients based on the second reference block;

derive a set of gradient parameters based on the first x-gradients, the first y-gradients, the second x-gradients, the second y-gradients, first pixel values of the first reference block and second pixel values of the second reference block, and wherein all gradient parameters use fixed-point representations;

derive x-motion offset and y-motion offset using operations including right-shifting without any division operation, wherein the x-motion offset corresponds to a first numerator divided by a first denominator, and the y-motion offset corresponds to a second numerator divided by a second denominator, and wherein the first numerator, the first denominator, the second numerator and the second denominator are generated from linear combinations of products of two gradient parameters or linear combinations of the gradient parameters from the set of gradient parameters;

generate a refined predictor for the current block according to the first reference block, the second reference block, the first x-gradients and the first y-gradients, the second x-gradients and the second y-gradients, the x-motion offset, the y-motion offset, or a combination thereof; and encode or decode the current block based on the refined predictor.

9. A non-transitory computer readable medium storing program instructions causing a processing circuit of an apparatus to perform a video coding method, and the method comprising:

receiving input data associated with a current block in a current picture, wherein the current block is coded using bi-direction prediction;

determining a first reference block associated with the current block in a first reference picture from reference picture list 0 and a second reference block associated with the current block in a second reference picture from reference picture list 1, wherein the first reference block and the second reference block are pointed by true bi-direction motion vectors;

deriving first x-gradients and first y-gradients based on the first reference block, and second x-gradients and second y-gradients based on the second reference block;

deriving a set of gradient parameters based on the first x-gradients, the first y-gradients, the second x-gradients, the second y-gradients, first pixel values of the first reference block, second pixel values of the second reference block, or a combination thereof, and wherein all gradient parameters use integer representations, and wherein all gradient parameters use fixed-point representations;

deriving x-motion offset and y-motion offset using operations including right-shifting without any division operation, wherein the x-motion offset corresponds to a first numerator divided by a first denominator, and the y-motion offset corresponds to a second numerator divided by a second denominator, and wherein the first numerator, the first denominator, the second numerator and the second denominator are generated from linear combinations of products of two gradient parameters or linear combinations of the gradient parameters from the set of gradient parameters;

generating a refined predictor for the current block according to the first reference block, the second reference block, the first x-gradients and the first y-gradients, the second x-gradients and the second y-gradients, the x-motion offset, the y-motion offset, or a combination thereof; and encoding or decoding the current block based on the refined predictor.

* * * * *